(12) United States Patent
Zywiak

(10) Patent No.: US 11,703,890 B2
(45) Date of Patent: Jul. 18, 2023

(54) DETERMINING AND CONTROLLING A WEIGHT FLOW IN AN ENVIRONMENTAL CONTROL SYSTEM

(71) Applicant: Hamilton Sundstrand Corporation, Charlotte, NC (US)

(72) Inventor: Peter Zywiak, Avon, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 325 days.

(21) Appl. No.: 16/175,268

(22) Filed: Oct. 30, 2018

(65) Prior Publication Data

US 2020/0133314 A1 Apr. 30, 2020

(51) Int. Cl.
*G05D 7/06* (2006.01)
*G05B 15/02* (2006.01)

(52) U.S. Cl.
CPC ........... *G05D 7/0635* (2013.01); *G05B 15/02* (2013.01); *G05D 7/0623* (2013.01)

(58) Field of Classification Search
CPC .... B64D 13/06; G05D 7/0635; G05D 7/0623; G05B 15/02; Y02T 50/40; Y02T 50/50
See application file for complete search history.

(56) References Cited

U.S. PATENT DOCUMENTS

| 4,055,997 | A | | 11/1977 | Kniat | |
|---|---|---|---|---|---|
| 4,430,867 | A | * | 2/1984 | Warner | B64D 13/06 62/402 |
| 5,146,941 | A | | 9/1992 | Statler | |

(Continued)

FOREIGN PATENT DOCUMENTS

| DE | 102017125363 A1 | * | 5/2018 | ............. F02B 37/24 |
|---|---|---|---|---|
| DE | 102017125363 A1 | | 5/2018 | |
| EP | 2862803 A1 | | 4/2015 | |

OTHER PUBLICATIONS

Fogarty K.J., "Turbocharger Turbines: An Experimental Study on the Effects of Wastegate Size and Flow Passage Design", 2013, M.S. Thesis, Department of Mechanical Engineering, The Ohio State University, Columbus, pp. 1-214. (Year: 2013).*

(Continued)

*Primary Examiner* — Alexander Satanovsky
*Assistant Examiner* — Lyudmila Zaykova-Feldman
(74) *Attorney, Agent, or Firm* — Kinney & Lange, P.A.

(57) ABSTRACT

A method of determining and controlling a weight flow in an environmental control system includes sensing, using a turbine inlet temperature sensor, a turbine inlet temperature. A turbine inlet pressure is sensed using a turbine inlet pressure sensor. A turbine outlet pressure is sensed using a turbine outlet pressure sensor. A rotational shaft speed of a shaft is sensed using a rotational shaft speed sensor. The sensed turbine inlet temperature, the sensed turbine inlet pressure, the sensed turbine outlet pressure, and the sensed rotational shaft speed are received by a controller. A flow coefficient is determined by the controller using the turbine inlet pressure, the turbine outlet pressure, the shaft speed, and a Turbine Flow Coefficient Map. A weight flow through the turbine is determined by the controller using the flow coefficient, the turbine inlet temperature, a nozzle area, and the turbine inlet pressure.

14 Claims, 4 Drawing Sheets

(56) References Cited

U.S. PATENT DOCUMENTS

| | | | | |
|---|---|---|---|---|
| 5,461,882 A * | 10/1995 | Zywiak | ............... | B64D 13/06 62/401 |
| 9,119,977 B2 | 9/2015 | Rittner et al. | | |
| 9,334,807 B2 * | 5/2016 | deGaribody | ............ | G01S 17/02 |
| 9,556,798 B2 | 1/2017 | Ekanayake et al. | | |
| 2003/0132344 A1 * | 7/2003 | Johnson | ............... | B64D 13/00 244/118.5 |
| 2005/0115565 A1 * | 6/2005 | Geary | ............... | B64D 13/06 128/204.22 |
| 2009/0113896 A1 * | 5/2009 | Fukuda | ............... | F02C 6/08 701/100 |
| 2010/0061843 A1 * | 3/2010 | Anderson | ............ | F02B 37/004 415/183 |
| 2011/0108239 A1 * | 5/2011 | Bruno | ............... | B64D 13/06 165/104.19 |
| 2011/0151762 A1 * | 6/2011 | Barkowsky | ............ | B64D 13/06 454/76 |
| 2012/0039702 A1 * | 2/2012 | Sharp | ............... | F04D 29/4213 415/1 |
| 2014/0162542 A1 * | 6/2014 | Huart | ............... | B64D 13/02 454/75 |
| 2014/0208764 A1 * | 7/2014 | Ekanayake | ............... | G01F 1/69 60/773 |
| 2015/0268073 A1 | 9/2015 | Gaully et al. | | |
| 2016/0272331 A1 * | 9/2016 | Houssaye | ............ | B64D 13/06 |
| 2016/0311540 A1 * | 10/2016 | DeValve | ............... | B64D 13/08 |
| 2017/0227013 A1 * | 8/2017 | Kumar | ............... | F02B 37/225 |

OTHER PUBLICATIONS

Yorifuji, DE-102017125363-A1, Specification, Espacenet Translation into English, downloaded from the Internet on Apr. 5, 2021 (Year: 2018).*

Fogarty K.J Turbocharger turbines: an experimental study on the effects of wastegate size and flow passage design, Thesis, Ohio State Univ., 2013 (Year: 2013).*

Extended European Search Report for EP Application No. 19206145.5, dated Feb. 17, 2020, pp. 7.

Communication Pursuant to Article 94(3) EPC for Application No. 19206145.5, dated Mar. 15, 2021, pp. 4.

* cited by examiner

DETERMINING AND CONTROLLING A WEIGHT FLOW IN AN ENVIRONMENTAL CONTROL SYSTEM

BACKGROUND

The present disclosure relates to aircraft environmental control systems. More specifically, the present disclosure relates to determining a weight flow through a turbine of an environmental control system.

In an aircraft, conditioned air is supplied by the environmental control system to the cabin of the aircraft. Conditioned air is air at a temperature, pressure, and humidity desirable for aircraft passenger comfort and safety. Weight flow regulation is used in environmental control systems to ensure the conditioned air is at a sufficient pressure for delivery to an aircraft cabin. At or near ground level, the ambient pressure of the air is generally acceptable with little to no modification of the pressure necessary before delivery to the cabin of an aircraft. At cruising altitude, ambient air is often at such a low pressure that it must be compressed to an acceptable pressure as part of the conditioning process. Thus, the weight flow must be adjusted during flight to ensure the conditioned air is at a desirable pressure before it is delivered to the aircraft cabin.

Existing environmental control systems typically have a compressor section and a turbine section. A weight flow sensor is used to directly measure a weight flow of a gas through a turbine in the environmental control system. The presence of additional sensors adds to the total weight and complexity of an aircraft. The heavier an aircraft is, the more fuel that is required during its operation, thus, adding to the cost. Consequently, eliminating components in the aircraft reduces overall cost.

SUMMARY

A method of determining and controlling a weight flow in an environmental control system includes sensing, using a turbine inlet temperature sensor, a turbine inlet temperature of air flow at an inlet of a turbine. A turbine inlet pressure of the air flow at the inlet of the turbine is sensed using a turbine inlet pressure sensor. A turbine outlet pressure of the air flow at an outlet of the turbine is sensed using a turbine outlet pressure sensor. A rotational shaft speed of a shaft on which the turbine is mounted is sensed using a rotational shaft speed sensor. The sensed turbine inlet temperature, the sensed turbine inlet pressure, the sensed turbine outlet pressure, and the sensed rotational shaft speed are received by a controller including processing circuitry and computer-readable memory. A flow coefficient is determined by the controller using the turbine inlet pressure, the turbine outlet pressure, the rotational shaft speed, and a Turbine Flow Coefficient Map. A weight flow through the turbine is determined by the controller using the flow coefficient, the turbine inlet temperature, a nozzle area, and the turbine inlet pressure.

An environmental control system includes a turbine. The turbine includes a turbine inlet, a turbine outlet, and a turbine rotor. The environmental control system further includes a turbine temperature inlet sensor located upstream of the turbine, which provides a signal representative of turbine inlet temperature; a turbine pressure inlet sensor located upstream of the turbine, which provides a signal representative of turbine inlet pressure; a turbine pressure outlet sensor located downstream of the turbine, which provides a signal representative of turbine outlet pressure; and a rotational shaft speed sensor, which provides a signal representative of rotational shaft speed. The environmental control system further includes a controller that determines weight flow through the turbine as a function of a flow coefficient, the turbine inlet nozzle area, the turbine inlet pressure, and the turbine inlet temperature, according to the following equation:

$$W = \frac{F_C A_N P_{TIT}}{\sqrt{T}}$$

wherein W is the weight of flow through the turbine; $F_C$ is the flow coefficient; $A_N$ is the turbine inlet nozzle area; $P_{TIT}$ is the turbine inlet pressure; and T is the turbine inlet temperature.

DETAILED DESCRIPTION

The present disclosure relates to determining a weight flow through a turbine of an environmental control system using sensors already present in the environmental control system. In general, a flow coefficient can be determined using a turbine inlet pressure, a turbine outlet pressure, a rotational shaft speed, and an empirically derived Turbine Flow Coefficient Map. A weight flow can then be determined using the flow coefficient, the nozzle area of the turbine inlet, the turbine inlet pressure, and the turbine inlet temperature. The weight flow can then be used to open or close a valve to regulate the weight flow such that it falls within a target range. This obviates the need for a weight flow sensor in the turbine. This reduces the overall weight and complexity of the system, leading to fuel and cost savings.

Figure 1:
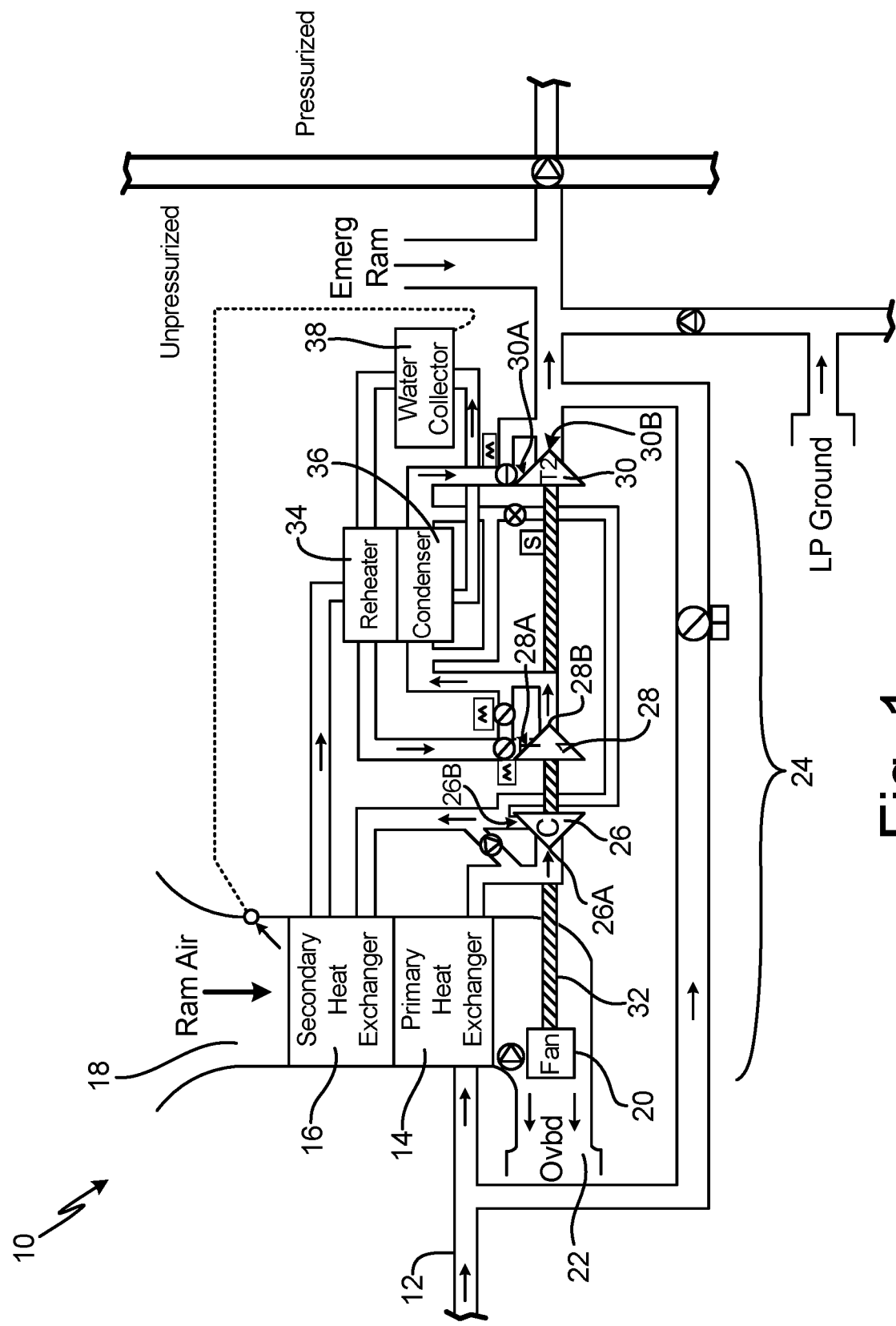
FIG. 1 is a schematic view of an environmental control system.

FIG. 1 is a schematic view of an environmental control system 10. FIG. 1 shows environmental control system 10, air inlet 12, primary heat exchanger 14, secondary heat exchanger 16, ram air inlet 18, ram air fan 20, ram air outlet 22, air cycle machine 24, compressor 26, first turbine 28, second turbine 30, shaft 32, reheater 34, condenser 36, and water collector 38.

Environmental control system 10 can be mounted in an aircraft to supply conditioned air to the aircraft cabin at the proper temperature and pressure. Air is ingested into environmental control system 10 through air intake 12 and flows through a duct to primary heat exchanger 14. A portion of the air that enters through air intake 12 can also be routed through a duct to bypass environmental control system 10. The air that enters air intake 12 can be compressed air that is bled off a gas turbine engine and/or compressed air from a dedicated cabin air compressor (not shown in FIG. 1).

Primary heat exchanger 14 is connected to secondary heat exchanger 16. Primary heat exchanger 14 and secondary heat exchanger 16 are used to cool the compressed air that flows through environmental control system 10 using cooling ram air. Ram air is pulled into environmental control system 10 through ram air inlet 18 with ram air fan 20 during operation on the group or air is forced into the system due to flight of the aircraft. The ram air flows across primary heat exchanger 14 and secondary heat exchanger 16 to cool the compressed air that flows through primary heat exchanger 14 and secondary heat exchanger 16. The used ram air is then dumped overboard through ram air outlet 22.

Compressed air from air intake 12 is ducted to primary heat exchanger 14 where it is cooled with the ram air that is pulled across primary heat exchanger 14 with ram air fan 20. The cooled air from primary heat exchanger 14 then flows to air cycle machine 24. Air cycle machine 24 includes compressor 26, first turbine 28, and second turbine 30 that are all mounted to shaft 32. Ram air fan 20 also forms a part of air cycle machine 24 and is mounted to shaft 32. The cooled air from primary heat exchanger 14 first flows through compressor 26 of air cycle machine 24 from compressor inlet 26A to compressor outlet 26B. Compressor 26 includes a compressor rotor mounted to shaft 32 that is rotated with shaft 32 to further compress the air flowing through compressor 26 of air cycle machine 24. The compressed air from compressor 26 then flows to secondary heat exchanger 16 where it is further cooled with ram air that is pulled across secondary heat exchanger 16.

The cooled air from secondary heat exchanger 16 then flows through a duct to reheater 34 and condenser 36. Reheater 34 mixes the cooled air with recirculated air from the aircraft cabin to heat the cooled air. Condenser 36 condenses the cooled air by lowering the air temperature. The reheated and condensed air then flows through a duct to water collector 38, which collects the condensed water out of the air. The air then flows from water collector 38 back through reheater 34. Air from reheater 34 then flows through first turbine 28 of air cycle machine 24 from first turbine inlet 28A to first turbine outlet 28B. First turbine 28 also includes a first turbine rotor mounted on shaft 32. Energy is extracted from the air expanding through first turbine 28 of air cycle machine 24 to drive shaft 32.

Air from first turbine 28 then flows back through condenser 36. Air from condenser 36 then flows through second turbine 30 of air cycle machine 24 from second turbine inlet 30A to second turbine outlet 30B. Second turbine 30 also includes a second turbine rotor mounted on shaft 32. Energy is extracted from the air expanding through second turbine 30 of air cycle machine 24 to drive shaft 32. Air from second turbine 30 then flows out of air cycle machine 24 to be delivered to the aircraft cabin.

Generally, the weight flow of air traveling through the environmental control system should be monitored and regulated. This ensures that the air provided to an aircraft cabin is at a proper temperature and pressure that is comfortable and safe for an operator or passenger.

Figure 2:
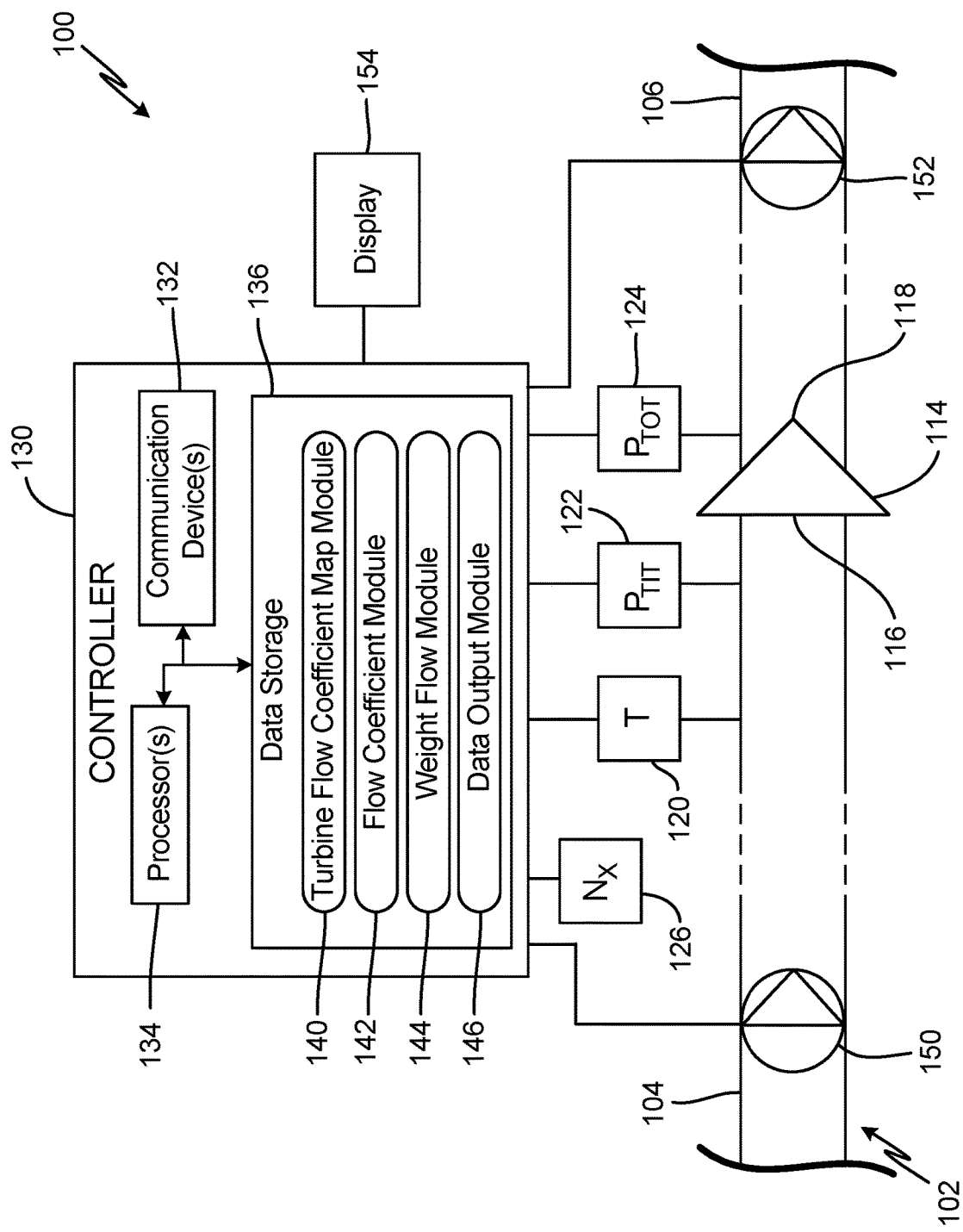
FIG. 2 is a schematic diagram of a gas flow path through a turbine of an environmental control system and a controller within the environmental control system.

FIG. 2 is a schematic diagram of gas flow path 102 through turbine 112 of environmental control system 100 and controller 130 within environmental control system 100. FIG. 2 shows environmental control system 100, gas flow path 102, air inlet 104, conditioned air outlet 106, turbine 114, turbine inlet 116, turbine outlet 118, turbine inlet temperature sensor 120, turbine inlet pressure sensor 122, turbine outlet pressure sensor 124, rotational shaft speed sensor 126, and controller 130. Controller 130 includes communication device(s) 132, processor(s) 134, and data storage 136. Data storage 136 includes Turbine Flow Coefficient Map module 140, flow coefficient module 142, weight flow module 144, and data output module 146. FIG. 2 also shows first weight flow control valve 150, second weight flow control valve 152, and display 154.

Environmental control system 100 includes gas flow path 102. Air enters into gas flow path 102 of environmental control system 100 at air intake 104 and exits environmental control system at conditioned air outlet 106. After entering gas flow path 102, the air may then flow through a heat exchanger, a compressor, a re-heater, or any other component of environmental control system 100. FIG. 2 shows a dashed path representing these components. The air then enters turbine 114 through turbine inlet 116 and subsequently exits turbine 114 at turbine outlet 118. After exiting turbine 114, the air may flow through additional components of environmental control system 100. FIG. 2 shows a dashed path representing these components. The conditioned air exits gas flow path 102 at conditioned air outlet 106 and is ready for delivery to the cabin of an aircraft.

Positioned immediately upstream of turbine inlet 116 of turbine 114 is turbine inlet temperature sensor 120 and turbine inlet pressure sensor 122. Positioned immediately downstream of turbine outlet 118 of turbine 114 is turbine outlet pressure sensor 124. When air enters turbine 114 at turbine inlet 116, turbine inlet temperature sensor 120 senses the temperature of the air and turbine inlet pressure sensor 122 senses the pressure of the air. When the air exits turbine 114 at turbine outlet 118, turbine outlet pressure sensor 124 senses the pressure of the air. Turbine 114 is mounted to a shaft (not shown in FIG. 2). Rotational shaft speed is sensed by rotational shaft speed sensor 126.

Controller 130 can communicate with turbine inlet temperature sensor 120, turbine inlet pressure sensor 122, turbine outlet pressure sensor 124, and rotational shaft speed sensor 126 with one or more wired or wireless connections. Controller 130 receives the sensed temperature from turbine inlet temperature sensor 120, the sensed pressure from turbine inlet pressure sensor 122, the sensed pressure from turbine outlet pressure sensor 124, and the rotational shaft speed from rotational shaft speed sensor 126.

Controller 130 can be any device capable of executing computer-readable instructions defining a software program. Controller 130, in some examples, also includes communication device(s) 132. Controller 130, in one example, utilizes communication device(s) 132 to communicate with external devices via one or more networks, such as one or more wireless or wired networks. Communication device(s) 132 can be a network interface card, such as an Ethernet card, an optical transceiver, a radio frequency transceiver, or any other type of device that can send and receive information. Other examples of such network interfaces can include Bluetooth, 3G, 4G, and WiFi radio computing devices as well as Universal Serial Bus (USB).

Controller 130 also includes processor(s) 134, which in one example, is configured to implement functionality and/or process instructions for execution within controller 130. For instance, processor(s) 134 can be capable of processing instructions stored in data storage 136. Examples of processor(s) 134 can include any one or more of a microprocessor, a controller, a digital signal processor (DSP), an application specific integrated circuit (ASIC), a field-programmable gate array (FPGA), or other equivalent discrete or integrated logic circuitry.

Controller 130 further includes data storage 136. Data storage 136 can include one or more databases. Though illustrated in FIG. 2 as integrated with controller 130, in other examples data storage 136 may be separate and communicatively coupled with controller 130. Data storage 136 stores a library of environmental control system parameters and programs, including but not limited to Turbine Flow Coefficient Map module 140, flow coefficient module 142, weight flow module 144, and output module 146.

Data storage 136 can be configured to store information within controller 130 during operation. Data storage 136, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, data storage 136 is a temporary memory, meaning that a primary purpose of data storage 136 is not long-term storage. Data storage 136, in some examples, is described as volatile memory, meaning that data storage 136 does not maintain stored contents when power to controller 130 is turned off. Examples of volatile memories can include random access memories (RAM), dynamic random access memories (DRAM), static random access memories (SRAM), and other forms of volatile memories. In some examples, data storage 136 is used to store program instructions for execution by processor(s) 134. Data storage 136, in one example, is used by software or applications running on controller 130 (e.g., a software program implementing architecture 10) to temporarily store information during program execution.

Data storage 136, in some examples, also includes one or more computer-readable storage media. Data storage 136 can be configured to store larger amounts of information than volatile memory. Data storage 136 can further be configured for long-term storage of information. In some examples, data storage 136 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

As illustrated in FIG. 2, controller 130 can include processor(s) 134, communication device(s) 132, and data storage 136. However, in certain examples, controller 130 can include more or fewer components than communication device(s) 132, processor(s) 134, and data storage 136.

Using the parameters and programs stored in data storage 136 and the data acquired from the communicatively coupled sensors such as turbine inlet temperature sensor 120, turbine inlet pressure sensor 122, turbine outlet pressure sensor 124, and rotational shaft speed sensor 126, processor(s) 134 is able to determine a flow coefficient and further determine a flow weight through turbine 114. The flow weight determination can then be sent to an output device. For example, the output device can be a control valve where the weight flow determination can be compared to a target range and a control valve may be opened or closed to change the weight flow of air through turbine 114. Output devices can also be configured to provide output to a user. Examples of an output device can include a display device, a sound card, a video graphics card, a speaker, a liquid crystal display (LCD), a light emitting diode (LED) display, an organic light emitting diode (OLED) display, or other type of device for outputting information in a form understandable to users or machines.

Figure 3:
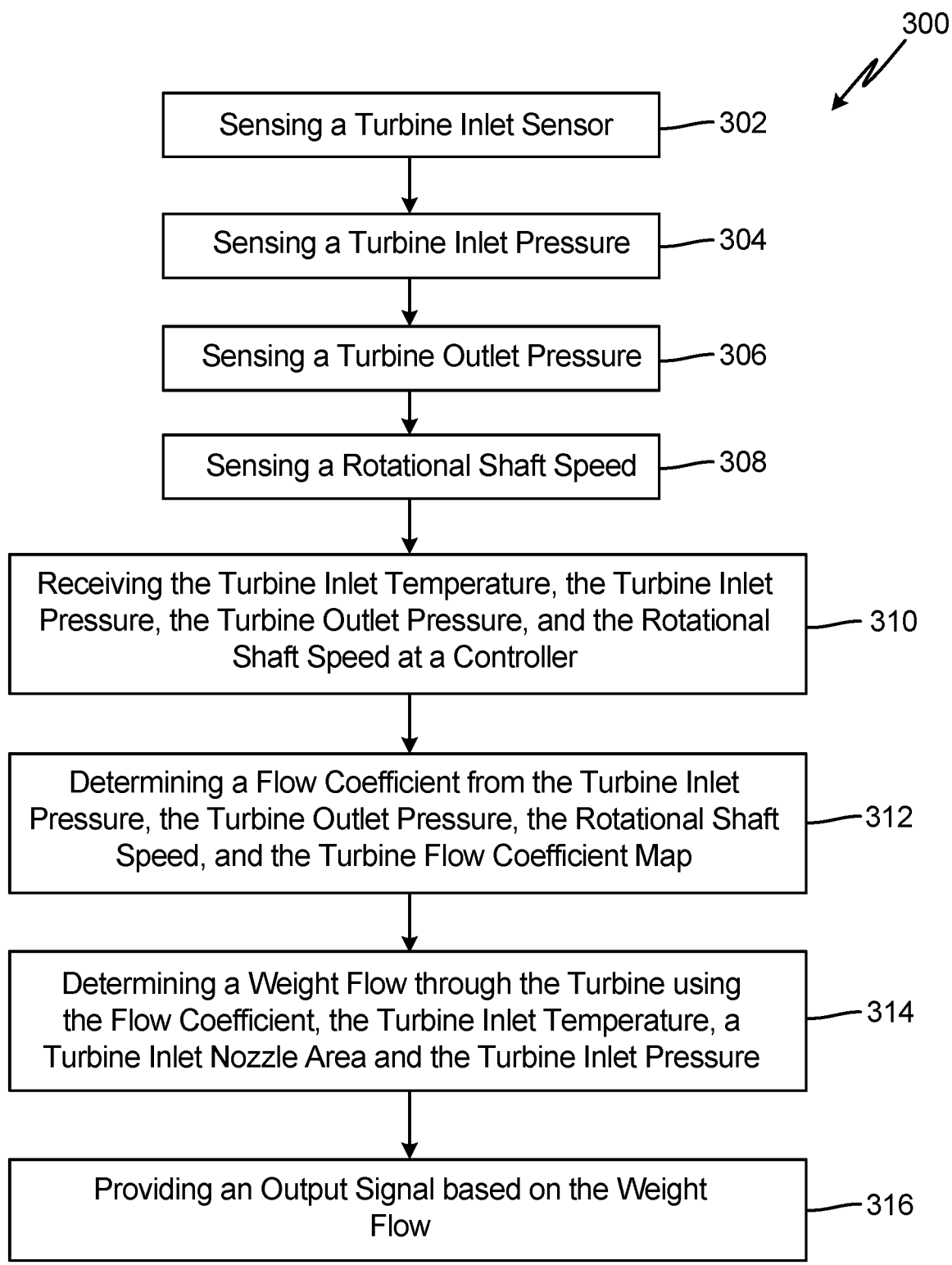
FIG. 3 is a flow chart showing a process for determining weight flow of air through the turbine of the environmental control system.
Figure 4:
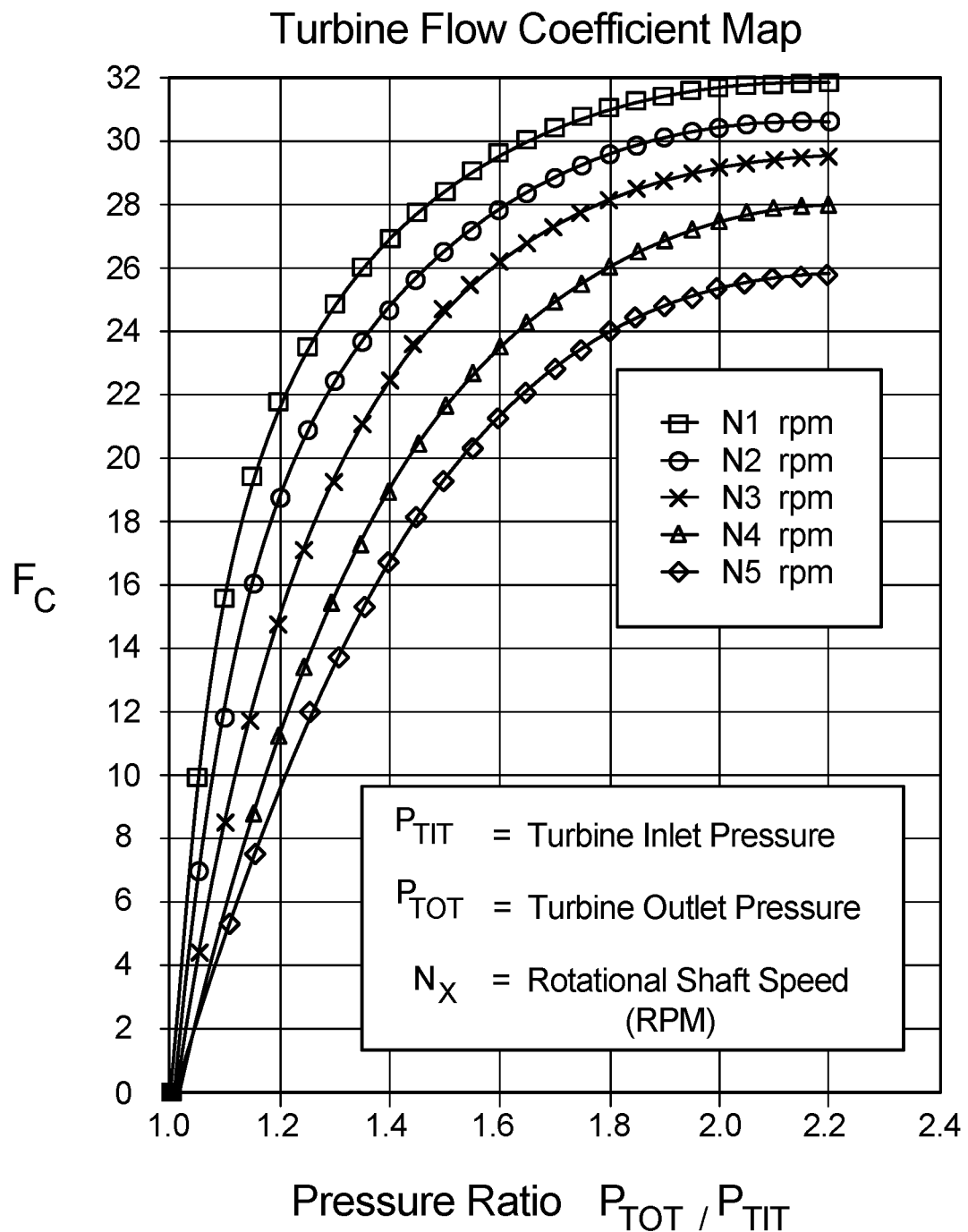
FIG. 4 is a graph of a Turbine Flow Coefficient Map.

FIG. 3 is a flow chart showing process 300 for determining weight flow (W) of air through turbine 114. FIG. 4 is a graph of a Turbine Flow Coefficient Map. FIGS. 3-4 will be discussed together. FIG. 3 shows steps 302, 304, 306, 308, 310, 312, 314, and 316.

Process 300 begins with step 302. Step 302 includes sensing turbine inlet temperature T of air flowing through environmental control system 100. As the air enters turbine inlet 116 of turbine 114, turbine inlet temperature sensor 120 senses turbine inlet temperature T of the air. Turbine inlet temperature sensor 120 is located immediately upstream of turbine inlet 116 of turbine 114.

Step 304 includes sensing turbine inlet pressure $P_{TIT}$ of air flowing through environmental control system 100. As the air enters turbine inlet 116 of turbine 114, turbine inlet pressure sensor 122 senses turbine inlet pressure $P_{TIT}$ of the air. Turbine inlet pressure sensor 122 is located immediately upstream of turbine inlet 116 of turbine 114.

Step 306 includes sensing turbine outlet pressure $P_{TOT}$ of air flowing through environmental control system 100. As the air exits turbine outlet 118 of turbine 114, turbine outlet pressure sensor 124 senses turbine outlet pressure $P_{TOT}$ of the air. Turbine outlet pressure sensor 124 is located immediately downstream of turbine outlet 118 of turbine 114.

Step 308 includes sensing rotational shaft speed $N_x$ of a shaft in environmental control system 100. Rotational shaft speed sensor 126 is located adjacent to the shaft and senses the rotational shaft speed $N_x$.

Step 310 includes receiving turbine inlet temperature T, turbine inlet pressure $P_{TIT}$, turbine outlet pressure $P_{TOT}$, and rotational shaft speed $N_x$ at controller 130, which receives turbine inlet temperature T, turbine inlet pressure $P_{TIT}$, turbine outlet pressure $P_{TOT}$, and rotational shaft speed $N_x$ through communication device(s) 132. Controller 130 may send turbine inlet temperature T, turbine inlet pressure $P_{TIT}$, turbine outlet pressure $P_{TOT}$, and rotational shaft speed $N_x$ to processor(s) 134 and/or controller 130 may send turbine inlet temperature T, turbine inlet pressure $P_{TIT}$, turbine outlet pressure $P_{TOT}$, and rotational shaft speed $N_x$ to data storage 136.

Step 312 includes determining flow coefficient $F_C$ from turbine inlet pressure $P_{TIT}$, turbine outlet pressure $P_{TOT}$, rotational shaft speed $N_x$, and a Turbine Flow Coefficient Map using controller 130. As illustrated in FIG. 4, flow coefficient $F_C$ is a function of a pressure ratio (turbine outlet pressure $P_{TOT}$/turbine inlet pressure $P_{TIT}$) and rotational shaft speed $N_x$. FIG. 4 shows the Turbine Flow Coefficient Map, which is a series of empirically derived curves which vary based upon flow coefficient $F_C$, rotational shaft speed $N_x$, and pressure ratio (turbine outlet pressure $P_{TOT}$/turbine inlet pressure $P_{TIT}$). First, processor(s) 134 of controller 130 will determine a pressure ratio (turbine outlet pressure $P_{TOT}$/turbine inlet pressure $P_{TIT}$). Next, processor(s) 134 of controller 130 obtains Turbine Flow Coefficient Map from Turbine Flow Coefficient Map module 140. The Turbine Flow Coefficient Map has the pressure ratio (turbine outlet pressure $P_{TOT}$/turbine inlet pressure $P_{TIT}$) along the x-axis and flow coefficient $F_C$ along the y-axis. Empirically derived curves based upon rotational shaft speed $N_x$ are mapped out on the Turbine Flow Coefficient Map. Processor(s) 134 of controller 130 will then use flow coefficient module 142 to determine flow coefficient $F_C$. Next, an empirically defined curve is identified based upon rotational shaft speed $N_x$. Then, the pressure ratio (turbine outlet pressure $P_{TOT}$/turbine inlet pressure $P_{TIT}$) is identified on the x-axis. Flow coefficient $F_C$ is then mapped based on the pressure ratio (turbine outlet pressure $P_{TIT}$T/turbine inlet pressure $P_{TIT}$) and the empirically defined curve. On the Turbine Flow Coefficient Map of FIG. 4, the curve $N_1$, is representative of a faster rotational shaft speed $N_x$ and correspondingly has a higher flow coefficient $F_C$ than the curve $N_5$, which is representative of a slower rotational shaft speed $N_x$, at the same pressure ratio (turbine outlet pressure $P_{TOT}$/turbine inlet pressure $P_{TIT}$).

Step 314 includes determining weight flow W through turbine 114 using flow coefficient $F_C$, turbine inlet temperature T, nozzle area $A_N$, and turbine inlet pressure $P_{TIT}$ using controller 130. Processor(s) 134 of controller 130 obtains weight flow module 144 from data storage 136. Weight flow module 144 stores the following equation which is used to calculate weight flow W:

$$W = \frac{F_C A_N P_{TIT}}{\sqrt{T}}$$

Wherein W is the weight flow through the turbine;
$F_C$ is the flow coefficient;
$A_N$ is the nozzle area of the turbine inlet;
$P_{TIT}$ is the turbine inlet pressure; and
T is the turbine inlet temperature.

Step 316 includes providing an output signal based on weight flow W. Controller 130 obtains data output module 146 of data storage 136 to determine an output signal. Once the output signal is determined, communication device(s) 132 of controller 130 can send the output signal to an output device. For example, output module 146 can be used to compare weight flow W to a target range of weight flow values, which are safe and comfortable for passengers within an aircraft cabin. The determined result can be used to control the output device with the output signal. Output device can be first weight flow control valve 150 and/or second weight flow control valve 152. If weight flow W is above a target range, then an output can be sent to first weight flow control valve 150 and/or to second weight flow control valve 152 to close until weight flow W falls within the target range. If weight flow W is below a target range, then an output can be sent to first weight flow control valve 150 and/or to second weight flow control valve 152 to open the valve until weight flow W falls within the target range. Further, output module 146 can translate weight flow W to an output signal that can be communicated to display 154. Display 154 can communicate weight flow W to a user. In a further example, output module 146 can translate weight flow W to an output signal that can be communicated to other control systems within the aircraft.

The foregoing disclosure obviates the need for a turbine flow sensor in the environmental control system. This not only reduces the complexity of the aircraft system architecture and pack requirements, but also reduces the weight and fuel costs, leading to an overall cost savings.

Discussion of Possible Embodiments

The following are non-exclusive descriptions of possible embodiments of the present invention.

A method includes sensing, using a turbine inlet temperature sensor, a turbine inlet temperature of air flow at an inlet of a turbine; sensing, using a turbine inlet pressure sensor, a turbine inlet pressure of the air flow at the inlet of the turbine; sensing, using a turbine outlet pressure sensor, a turbine outlet pressure of the air flow at an outlet of the turbine; sensing, using a rotational shaft speed sensor, a rotational shaft speed of a shaft on which the turbine is mounted; receiving, by a controller including processing circuitry and computer-readable memory, the sensed turbine inlet temperature, the sensed turbine inlet pressure, the sensed turbine outlet pressure, and the sensed rotational shaft speed; determining, by the controller, a flow coefficient using the turbine inlet pressure, the turbine outlet pressure, the rotational shaft speed, and a Turbine Flow Coefficient Map; determining, by the controller, a weight flow through the turbine using the flow coefficient, the turbine inlet temperature, a turbine inlet nozzle area, and the turbine inlet pressure; and providing, by the controller, an output signal based on the weight flow.

The method of the preceding paragraph can optionally include, additionally and/or alternatively, any one or more of the following:

The method includes operating a control valve based upon the output signal.

The control valve is located upstream of the turbine inlet temperature sensor and the turbine inlet pressure sensor.

The control valve is located downstream of the turbine outlet pressure sensor.

The method includes comparing the determined weight flow through the turbine to a target range and opening the control valve when the weight flow through the turbine is below the target range.

The method includes comparing the determined weight flow through the turbine to a target range and closing the control valve when the weight flow through the turbine is above the target range.

The method includes communicating the output signal to a display which indicates the weight flow through the turbine to a user.

The Turbine Flow Coefficient Map includes a set of empirically derived curves.

The Turbine Flow Coefficient Map is plotted as a pressure ratio of the turbine outlet pressure over the turbine inlet pressure as a function of the rotational shaft speed versus the flow coefficient.

The pressure ratio of the turbine outlet pressure over the turbine inlet pressure is plotted on a x-axis as a function of the rotational shaft speed and the flow coefficient is plotted on a y-axis.

The flow coefficient is mapped based on the pressure ratio of the turbine outlet pressure over the turbine inlet pressure and the set of empirically defined curves.

The method includes determining the weight flow through the turbine according to the following equation:

$$W = \frac{F_C A_N P_{TIT}}{\sqrt{T}}$$

where W is the weight flow through the turbine, $F_C$ is the flow coefficient, $A_N$ is the turbine inlet nozzle area, $P_{TIT}$ is the turbine inlet pressure, and T is the turbine inlet temperature.

An environmental control system includes a turbine which includes a turbine inlet, a turbine outlet, and a turbine rotor. The environmental control system further includes a turbine inlet temperature sensor located upstream of the turbine, which provides a signal representative of turbine inlet temperature; a turbine inlet pressure sensor located upstream of the turbine, which provides a signal representative of turbine inlet pressure; a turbine outlet pressure sensor located downstream of the turbine, which provides a signal representative of turbine outlet pressure; a rotational shaft speed sensor, which provides a signal representative of rotational shaft speed; a controller that determines weight flow through the turbine as a function of a flow coefficient, a turbine inlet nozzle area, the turbine inlet pressure, and the turbine inlet temperature, according to the following equation:

$$W = \frac{F_C A_N P_{TIT}}{\sqrt{T}}$$

where W is the weight of flow through the turbine, $F_C$ is the flow coefficient, $A_N$ is the turbine inlet nozzle area, $P_{TIT}$ is the turbine inlet pressure, T is the turbine inlet temperature, and where the controller produces an output signal based upon the determined weight flow.

The system of the preceding paragraph can optionally include, additionally and/or alternatively, any one or more of the following features, configurations and/or additional components:

The system includes a control valve communicatively connected to the controller and located upstream of the turbine inlet temperature sensor and the turbine inlet pressure sensor, wherein the control valve can be opened and closed based upon the output signal.

The system includes a control valve communicatively connected to the controller and located downstream of the turbine outlet pressure sensor, wherein the control valve can be opened and closed based upon the output signal.

The system includes a display communicatively connected to the controller, wherein the display is configured to indicate the determined weight flow to a user based upon the output signal.

The controller determines the flow coefficient using the turbine inlet pressure, the turbine outlet pressure, the rotational shaft speed, and a Turbine Flow Coefficient Map.

The Turbine Flow Coefficient Map includes a set of empirically derived curves.

The Turbine Flow Coefficient Map is plotted as a pressure ratio of the turbine outlet pressure over the turbine inlet pressure as a function of the rotational shaft speed versus the flow coefficient.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of supplying conditioned air to an aircraft cabin of an aircraft, the method comprising:
    receiving, with an air intake, compressed air;
    cooling, with a primary heat exchanger and a secondary heat exchanger, the compressed air using ram air;
    mixing, with a reheater which is fluidly connected to the secondary heat exchanger, the cooled air from the secondary heat exchanger with recirculated air from the aircraft cabin;
    condensing, with a condenser, the cooled air;
    sensing, by a turbine inlet sensor, a turbine inlet temperature of the condensed and cooled air at an inlet of a turbine for an aircraft, wherein the turbine is a component of an environmental control system and the turbine inlet sensor is upstream of and adjacent to the inlet of the turbine;
    sensing, by a turbine inlet pressure sensor, a turbine inlet pressure of the condensed and cooled air at the inlet of the turbine;
    sensing, by a turbine outlet pressure sensor, a turbine outlet pressure of the condensed and cooled air at an outlet of the turbine;
    sensing, by a rotational speed sensor, a rotational speed of a rotor of the turbine;
    receiving, by a controller including processing circuitry and computer-readable memory, the sensed turbine inlet temperature, the sensed turbine inlet pressure, the sensed turbine outlet pressure, and the sensed rotational shaft speed;
    determining, by the controller, a flow coefficient using the turbine inlet pressure, the turbine outlet pressure, the rotational speed, and a turbine flow coefficient map, wherein the turbine flow coefficient map includes a set of empirically derived curves;
    determining, by the controller, a weight flow through the turbine using the flow coefficient, the turbine inlet temperature, a turbine inlet nozzle area, and the turbine inlet pressure, wherein determining the weight flow through the turbine is according to the following equation:

$$W = \frac{F_C A_N P_{TIT}}{\sqrt{T}}$$

wherein W is the weight flow through the turbine;
    $F_C$ is the flow coefficient;
    $A_N$ is the turbine inlet nozzle area;
    $P_{TIT}$ is the turbine inlet pressure; and
    T is the turbine inlet temperature;
    determining, by the controller, whether the weight flow is within a target weight flow range;
    providing, by the controller, an output signal to a control valve based on the weight flow in response to the weight flow falling outside the target weight flow range;
    operating the control valve based upon the output signal; and
    delivering the condensed and cooled air to the aircraft cabin as conditioned air.

2. The method of claim 1, wherein the control valve is located upstream of the turbine inlet temperature sensor and the turbine inlet pressure sensor.

3. The method of claim 1, wherein the control valve is located downstream of the turbine outlet pressure sensor.

4. The method of claim 1, further comprising:
    opening the control valve when the weight flow through the turbine is below the target weight flow range.

5. The method of claim 1, further comprising:
    closing the control valve when the weight flow through the turbine is above the target weight flow range.

6. The method of claim 1, further comprising:
    communicating the output signal to a display which indicates the weight flow through the turbine to a user.

7. The method of claim 1, wherein the turbine flow coefficient map is plotted as a pressure ratio of the turbine outlet pressure over the turbine inlet pressure as a function of the rotational speed versus the flow coefficient.

8. The method of claim 7, wherein the pressure ratio of the turbine outlet pressure over the turbine inlet pressure is plotted on an x-axis as a function of the rotational speed and the flow coefficient is plotted on a y-axis.

9. The method of claim 7, wherein the flow coefficient is mapped based on the pressure ratio of the turbine outlet pressure over the turbine inlet pressure and the set of empirically defined curves.

10. An environmental control system for supplying conditioned air to an aircraft cabin of an aircraft, the environmental control system comprising:
- an air intake which receives compressed air;
- a primary heat exchanger which is fluidly connected to the air intake;
- a secondary heat exchanger which is fluidly connected to the primary heat exchanger, wherein the primary heat exchanger and the secondary heat exchanger cool the compressed air received by the air intake using ram air;
- a reheater which is fluidly connected to the secondary heat exchanger and which mixes the cooled air from the secondary heat exchanger with recirculated air from the aircraft cabin;
- a condenser which condenses the cooled air;
- a turbine for the aircraft that includes a turbine inlet, a turbine outlet, and a rotor, wherein the turbine inlet intakes the condensed and cooled air;
- a turbine inlet temperature sensor located upstream of the turbine, which provides a signal representative of turbine inlet temperature, wherein the turbine inlet sensor is upstream of and adjacent to the turbine inlet;
- a turbine inlet pressure sensor located upstream of the turbine, which provides a signal representative of turbine inlet pressure;
- a turbine outlet pressure sensor located downstream of the turbine, which provides a signal representative of turbine outlet pressure;
- a rotational speed sensor, which provides a signal representative of rotational speed of the rotor;
- a controller that determines weight flow of the condensed and cooled air through the turbine as a function of a flow coefficient, a turbine inlet nozzle area, the turbine inlet pressure, and the turbine inlet temperature, according to the following equation:

$$W = \frac{F_C A_N P_{TIT}}{\sqrt{T}}$$

wherein W is the weight of flow through the turbine;
$F_C$ is the flow coefficient;
$A_N$ is the turbine inlet nozzle area;
$P_{TIT}$ is the turbine inlet pressure;
T is the turbine inlet temperature; and
wherein the controller produces an output signal based upon the determined weight flow and is configured to determine the flow coefficient using the turbine inlet pressure, the turbine outlet pressure, the rotational speed, and a turbine flow coefficient map which includes a set of empirically derived curves; and
a control valve communicatively connected to the controller, wherein the control valve can be opened and closed based upon the output signal;
wherein the controller is further configured to determine whether the determined weight flow is within a target weight flow range and to send the output signal to the control valve when the determined weight flow is outside the target weight flow range, and the turbine delivers the condensed and cooled air to the aircraft cabin as conditioned air.

11. The system of claim 10, wherein the control valve is located upstream of the turbine inlet temperature sensor and the turbine inlet pressure sensor.

12. The system of claim 10, wherein the control valve is located downstream of the turbine outlet pressure sensor.

13. The system of claim 10, and further comprising:
- a display communicatively connected to the controller, wherein the display is configured to indicate the determined weight flow to a user based upon the output signal.

14. The system of claim 10, wherein the turbine flow coefficient map is plotted as a pressure ratio of the turbine outlet pressure over the turbine inlet pressure as a function of the rotational speed versus the flow coefficient.

* * * * *